US012621308B2

(12) United States Patent
Loncaric et al.

(10) Patent No.: US 12,621,308 B2
(45) Date of Patent: May 5, 2026

(54) SYSTEMS AND METHODS FOR SESSION TIME DURATION MANAGEMENT BASED ON USER LOGIN ATTRIBUTES

(71) Applicant: JPMORGAN CHASE BANK, N.A., New York, NY (US)

(72) Inventors: Goran Loncaric, Frisco, TX (US); Sandeep Reddy Banala, Monroe, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 246 days.

(21) Appl. No.: 18/331,531

(22) Filed: Jun. 8, 2023

(65) Prior Publication Data

US 2024/0414170 A1    Dec. 12, 2024

(51) Int. Cl.
*H04W 12/61*      (2021.01)
*H04L 9/40*       (2022.01)
*H04L 67/143*     (2022.01)

(52) U.S. Cl.
CPC .......... *H04L 63/108* (2013.01); *H04L 63/107* (2013.01)

(58) Field of Classification Search
CPC ..... H04L 63/108; H04L 63/107; H04L 67/02; H04L 67/143; G06F 21/604; H04W 12/61
See application file for complete search history.

(56) References Cited

U.S. PATENT DOCUMENTS

| | | | | |
|---|---|---|---|---|
| 2005/0015601 A1* | 1/2005 | Tabi | .................... | G06F 21/6227 |
| | | | | 713/182 |
| 2017/0339176 A1* | 11/2017 | Backer | ................ | H04L 63/1425 |
| 2020/0034521 A1* | 1/2020 | Teng | ..................... | H04L 63/083 |
| 2020/0099753 A1* | 3/2020 | Fleck | .................... | H04L 67/145 |
| 2020/0220853 A1* | 7/2020 | Xu | ......................... | G06F 16/955 |

OTHER PUBLICATIONS

Extended European Search Report, dated Sep. 17, 2024, from corresponding European Patent Application No. 24180733.8.

* cited by examiner

*Primary Examiner* — Amie C. Lin
(74) *Attorney, Agent, or Firm* — GREENBERG TRAURIG LLP

(57)          ABSTRACT

Systems and methods for session time duration management based on user login attributes are disclosed. A method may include: receiving, at an authentication platform for a website and from a browser executed by an electronic device, a user login; authenticating the user login credentials; requesting a session with the browser with a modified session idle time from a session provider, wherein the session provider is configured to generate a session cookie with the modified session idle time; receiving the session cookie from the session provider; and communicating the session cookie to the browser. The website may be configured to receive an interaction from the browser in the session, determine a current session idle time for the session, compare the current session idle time to the modified session idle time, and terminate the session in response to the current session idle time being greater than the modified session idle time.

12 Claims, 4 Drawing Sheets

SYSTEMS AND METHODS FOR SESSION TIME DURATION MANAGEMENT BASED ON USER LOGIN ATTRIBUTES

BACKGROUND OF THE INVENTION

1. Field of the Invention

Embodiments are generally directed to systems and methods for session time duration management based on user login attributes.

2. Description of the Related Art

When customers use a public personal computer, such as one in a library, a hotel business center, etc., or borrow a mobile device from a friend, to do their online banking or any other secure activity, they sometimes do not log out at the end of their session. This provides an opportunity for a malicious actor to take over the session once the genuine user leaves the premises, as the session continues to be alive for usually between five and twenty minutes of inactivity before it is automatically terminated.

Currently, session length, also known as "alive time" or "maximum inactivity period" is static, and service providers rely on other techniques (e.g., step-up authentication) to mitigate the threat of account takeover or fraudulent transactions. But step-ups do not cover all interactions that may expose a customer to risk. For example, no step up authentication may be required for the customer—or a malicious actor—to review the customer's statements.

SUMMARY OF THE INVENTION

Systems and methods for session time duration management based on user login attributes are disclosed. According to one embodiment, a method for session time duration management based on user login attributes may include: (1) receiving, at a computer program for an authentication platform for a website or resource and from a browser executed by an electronic device, a user login comprising user login credentials and electronic device information for the electronic device; (2) authenticating, by the computer program, the user login credentials; (3) requesting, by the computer program, a session with the browser with a modified session idle time from a session provider, wherein the session provider is configured to generate a session cookie with the modified session idle time; (4) receiving, by the computer program, the session cookie from the session provider; and (5) communicating, by the computer program, the session cookie to the browser. The website or resource is configured to receive an interaction from the browser in the session, determine a current session idle time for the session, compare the current session idle time to the modified session idle time, and terminate the session in response to the current session idle time being greater than the modified session idle time.

In one embodiment, the modified session idle time may have a shorter time than a default session idle time. The modified session idle time may be requested in response to the electronic device being a public electronic device based on an IP address or a geolocation of the electronic device, in response to the electronic device being a first interaction with the electronic device, etc.

In one embodiment, the modified session idle time may have a longer time than a default session idle time. The modified session idle time may be requested in response to the electronic device being a trusted electronic device.

In one embodiment, the website or resource may determine the current session idle time for the session based on a timestamp for the interaction with the browser and a last update timestamp in the session cookie.

According to another embodiment, a system may include: an electronic device executing a browser; a session provider; and an authentication platform for a website or resource executing a computer program. The computer program receives a user login comprising user login credentials and electronic device information for the electronic device from the browser; authenticates the user login credentials; and requests a session with the browser with a modified session idle time from the session provider. The session provider generates a session cookie with the modified session idle time. The computer program receives the session cookie from the session provider and communicates the session cookie to the browser. The website or resource: receives an interaction from the browser in the session; determines a current session idle time for the session; compares the current session idle time to the modified session idle time; and terminates the session in response to the current session idle time being greater than the modified session idle time.

In one embodiment, the modified session idle time may have a shorter time than a default session idle time. The modified session idle time may be requested in response to the electronic device being a public electronic device based on an IP address or a geolocation of the electronic device, in response to the electronic device being a first interaction with the electronic device, etc.

In one embodiment, the modified session idle time may have a longer time than a default session idle time. The modified session idle time may be requested in response to the electronic device being a trusted electronic device.

In one embodiment, the website or resource may determine the current session idle time for the session based on a timestamp for the interaction with the browser and a last update timestamp in the session cookie.

According to another embodiment, a non-transitory computer readable storage medium may include instructions stored thereon, which when read and executed by one or more computer processors, cause the one or more computer processors to perform steps comprising: receiving, from a browser executed by an electronic device, a user login comprising user login credentials and electronic device information for the electronic device; authenticating the user login credentials; requesting a session with the browser with a modified session idle time from a session provider, wherein the session provider is configured to generate a session cookie with the modified session idle time; receiving the session cookie from the session provider; and communicating the session cookie to the browser; wherein a website or resource is configured to receive an interaction from the browser in the session, determine a current session idle time for the session, compare the current session idle time to the modified session idle time, and terminate the session in response to the current session idle time being greater than the modified session idle time.

In one embodiment, the modified session idle time may have a shorter time than a default session idle time, and the modified session idle time may be requested in response to the electronic device being a public electronic device based on an IP address or a geolocation of the electronic device or in response to the electronic device being a first interaction with the electronic device.

In one embodiment, the modified session idle time may have a longer time than a default session idle time, and the modified session idle time may be requested in response to the electronic device being a trusted electronic device.

In one embodiment, the website or resource may determine the current session idle time for the session based on a timestamp for the interaction with the browser and a last update timestamp in the session cookie.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Systems and methods for session time duration management based on user login attributes are disclosed.

In embodiments, the threat of malicious actors gaining access to customer data or making fraudulent transactions may be mitigated by dynamically (i.e., in real time) making the session idle time shorter (e.g., from 5min to 1 min of inactivity) that the standard of default session idle time when a login from a public, unknown, or suspicious electronic device is identified. An electronic device may be identified as such from its IP address, when it shows up as a new or unrecognized device for the user, etc. This reduces the amount of vulnerability time window for a malicious actor to take over the account.

In embodiments, the session idle time may be made longer than the standard or default session idle time if the electronic device is a trusted electronic device (e.g., used by a corporate user, no suspicious activity, etc.).

Figure 1:
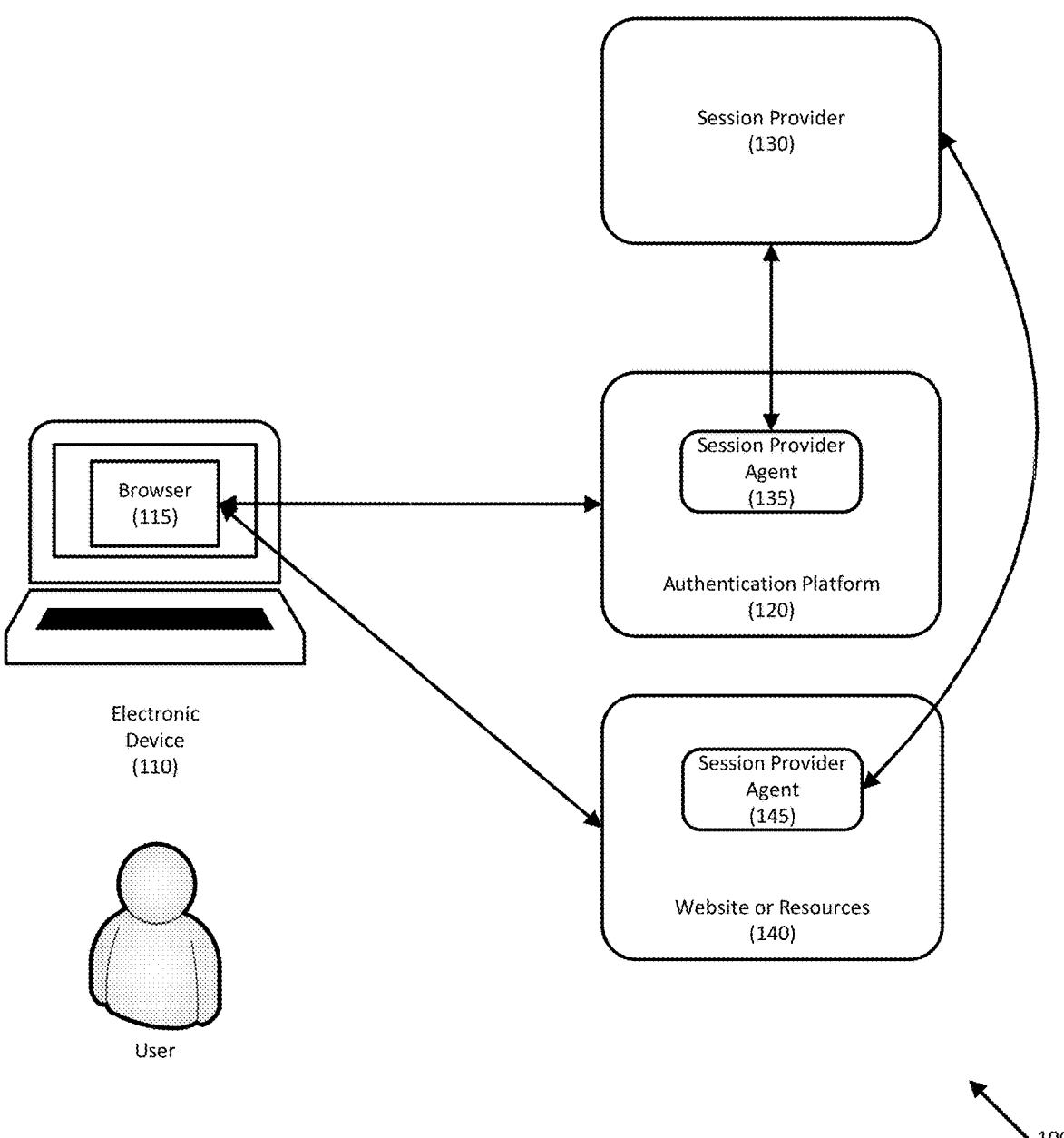
FIG. 1 illustrates a system for session time duration management based on user login attributes according to an embodiment.

Referring to FIG. 1, a system for session time duration management based on user login attributes is disclosed according to an embodiment. System 100 may include electronic device 110, which may be a computer (e.g., workstation, desktop, laptop, notebook, tablet, etc.), smart device (e.g., smart phone, smart watch, etc.), an Internet of Things (IOT) appliance, etc. Electronic device may be a public electronic device, such as a computer at a library, a hotel business center, etc., or it may be personal electronic device. Electronic device 110 may execute browser computer program 115, which may be used to access a website or resources 140 for an entity. Electronic device 110 may execute one or more computer programs, such as browser 115.

In accessing website/resources 140, browser 115 may be pointed to authentication platform 120 for the entity. Authentication platform 120 may receive user login credentials (e.g., a username and password) for a user from browser 115, and may then authenticate the user. Authentication platform 120 may also use multifactor authentication (MFA) as part of two-step authentication.

Authentication platform 120 may identify electronic device 110 as an electronic device for which a modified session idle time should be used. For example, the session idle time may be shortened or lengthened based on the user login credentials and other attributes received during login. For example, if electronic device 110 is identified as a public electronic device based on, for example, its IP address, geolocation, device identifier, etc., if authentication platform 120 has not seen electronic device 110 before, if authentication platform 120 has not seen electronic device 110 with the user credentials before (e.g., a borrowed electronic device), if electronic device 110 is suspicious (e.g., internal or third party reports of electronic device 110 being involved in fraud, the geolocation of electronic device 110 being in an area of suspected fraud, electronic device 110 being jailbroken, etc.), if electronic device 110 is associated with a certain type of entity (e.g., an aggregator), etc., the session idle time may be shortened to be less than the standard session idle time.

Conversely, if electronic device 110 is a trusted electronic device, the session idle time may be lengthened to be longer than the standard session idle time.

Authentication platform 120 may interact with session provider 130, which may be a third party, using, for example, session provider agent 135. Session provider agent 135 may be a plugin. Authentication platform 120 may request that session provider 130 create a session for the user with a modified idle time. For example, if the standard session idle time is 7 minutes, authentication platform 120 may request a session with a modified session idle time of 1 minute. As another example, authentication platform 120 may request a session with a modified session idle time of 10 minutes. Once the session is idle for the modified session idle time, the session is terminated and the user may be required to log in again, or to be authenticated in a different manner, in order to continue interacting with website or resources 140.

In one embodiment, the session idle time may be reduced or lengthened depending on a level of perceived risk. For example, if electronic device 110 is a public device, the session idle time may be set to 1 minute; if electronic device 110 is a new device, the session idle time may be set to 3 minutes.

The modified session idle times may be set as is necessary and/or desired.

Website or resources 140 may further include session provider agent 145 that may interface with session provider 130. Session provider agent 145 may be a plugin, and may monitor browser 115 interactions with website or resources 140 and may determine whether the session has been idle for more than the session idle time.

Figure 2A:
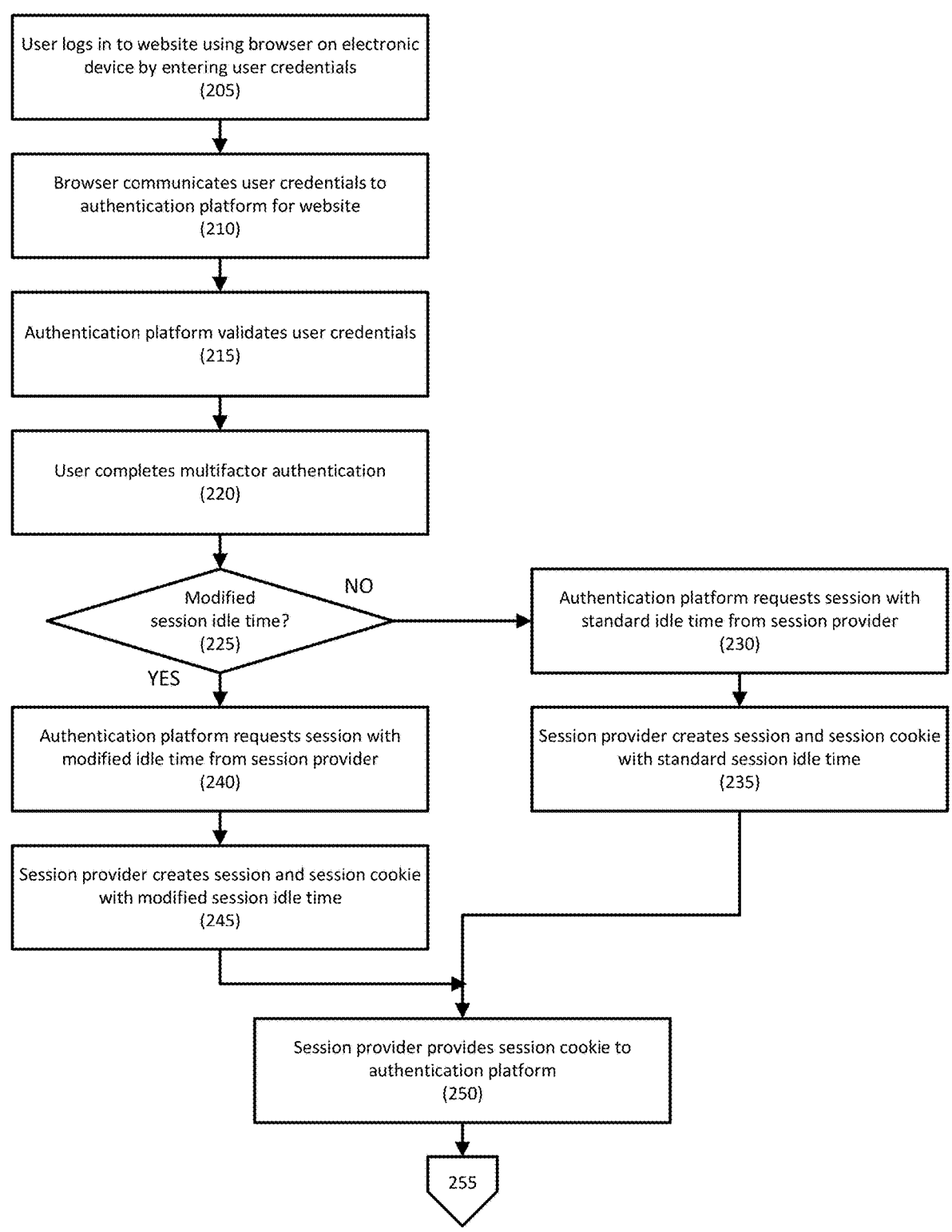
FIGS. 2A and 2B illustrate a session time duration management based on user login attributes according to an embodiment.
Figure 2B:
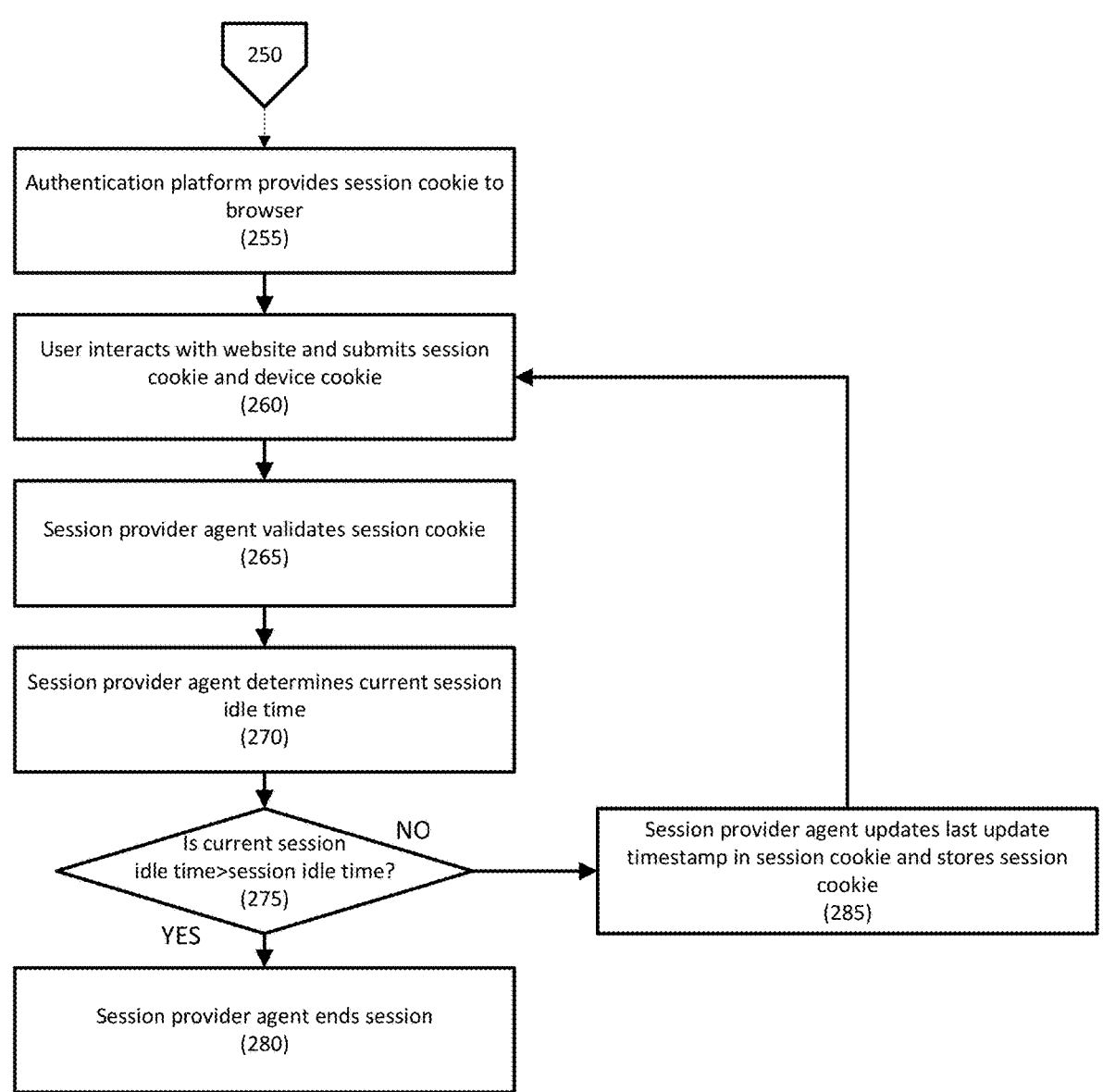

Referring to FIGS. 2A and 2B, a method for session time duration management based on user login attributes is disclosed according to an embodiment.

In step 205, a user may log in to a website or resource using a browser on an electronic device by entering user credentials. For example, the user may enter a user name and password.

In step 210, the browser may communicate the user credentials to an authentication platform for the website or resource.

In step 215, a computer program, such as an authentication computer program executed by the authentication platform, may validate the user credentials. In step 220, the user may optionally complete multifactor authentication, by, for example, entering a one-time code sent to a mobile number or email address on file.

In step 225, the authentication computer program may determine whether a modified session idle time (e.g., lengthened or shortened) should be used with the electronic device. For example, the authentication computer program may determine whether the electronic device is a public electronic device, such as a computer in a library, hotel business center, or similar (e.g., based on the IP address of the electronic device, the GPS location of the electronic device, another device identifier (e.g., MAC address) for the electronic device, etc.), whether the authentication platform has seen the electronic device before, whether authentication platform has seen the electronic device with the user credentials before, whether electronic device is suspicious (e.g., internal or third party reports of the electronic device being involved in fraud or suspicious activity, the geolocation of the electronic device being in an area of suspected fraud, the electronic device being jailbroken, etc.), if the electronic device is associated with a certain type of entity (e.g., an aggregator), etc., the session idle time may be shortened to be less than the standard session idle time.

Any other suitable reason for shortening the session idle time may be used as is necessary and/or desired.

Conversely, if the electronic device is trusted (e.g., used by a corporate user, no suspicious activity, etc.), the session idle time may be lengthened to be longer than the standard session idle time.

Any other suitable reason for lengthening the session idle time may be used as is necessary and/or desired.

If a modified session idle time is not desired, in step 230, using an authentication agent, the authentication platform may request a session with a standard or default idle time from the session provider.

In step 235, the session provider may create a session and a session cookie with the standard idle time.

If a modified session idle time is desired, in step 240, using an authentication provider agent, the authentication platform may request a session with a modified idle time (e.g., lengthened or shortened) from the session provider. In one embodiment, the authentication platform may identify a specific time for the session idle time; in another embodiment, the authentication platform may request a longer or shorter session idle time and the session provider may set the session idle time appropriately.

In step 245, the session provider may create a session and a session cookie with the modified session idle time. The session cookie may be an encrypted token that is stateless. It may include, for example, the user context, the session start time, a last update timestamp, the session idle time, a maximum timeout, etc.

In step 250, the session provider may provide the session cookie to the authentication platform which, in step 255, may provide the session cookie to the browser.

In step 260, the user may interact with the website or resource, and with each interaction, may submit the session cookie to the website or resource. For example, a session provider agent executed by the website or resource may monitor the interactions with the website or resource.

In step 265, the session provider agent executed by the website or resource may validate the session cookie and may retrieve the session idle time as well as the last update timestamp from the session idle cookie.

In step 270, the session provider agent may determine the current session idle time by, for example comparing the timestamp for the interaction from the browser (e.g., a http request) to the timestamp for the last update timestamp field in the stored session cookie.

In step 275, if the current session idle time is outside of the session idle time in the session cookie, in step 280, the session provider agent may terminate the session. Thus, if a fraudster tries to continue to use the session and a http request reaches the website or resource, the session provider agent will validate the idle time out using the session cookie, and will invalidate the session based on the idle time set inside the session cookie.

If the current session idle timer is not outside of the session idle time, in step 285, the session provider agent may update the last update timestamp with the timestamp of the interaction and the process may return to step 260.

Figure 3:
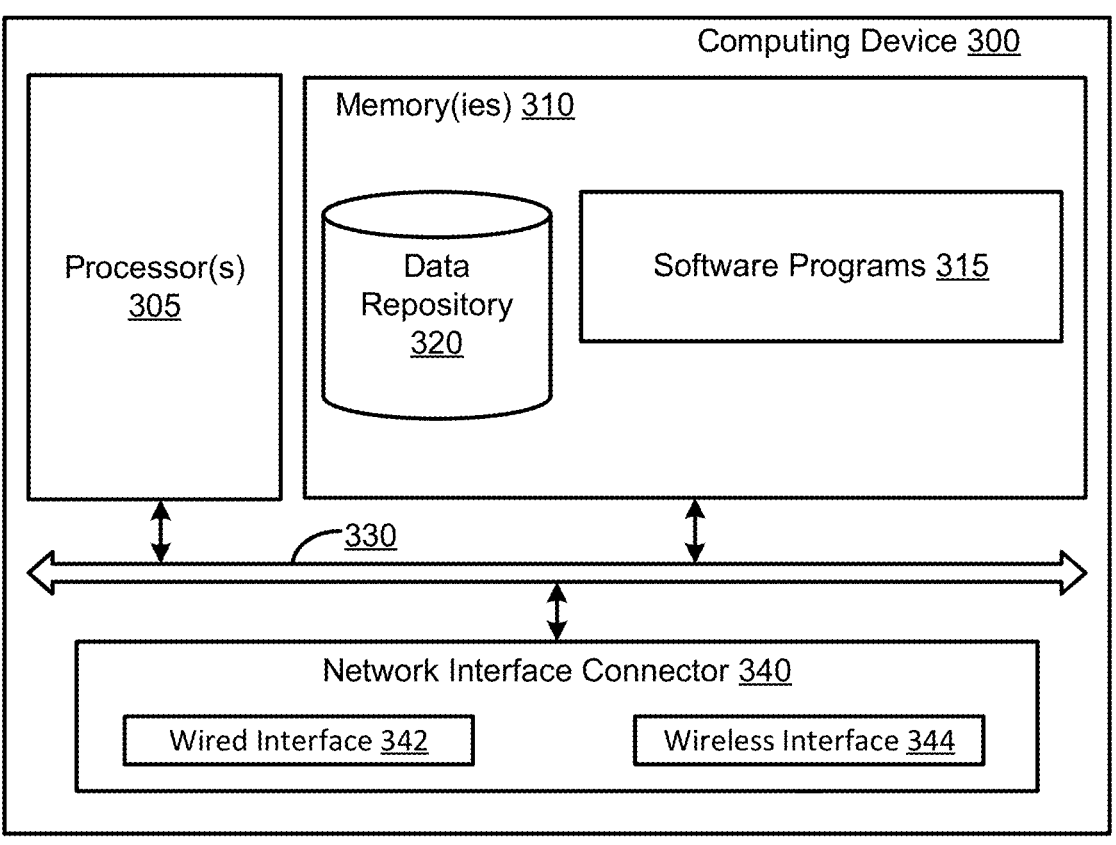
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for browser session time duration management based on user login attributes, comprising:

receiving, at a computer program for an authentication platform for a website or resource and from a browser executed by an electronic device, a user login comprising user login credentials and electronic device information for the electronic device, wherein the electronic device information identifies the electronic device as a public electronic device;

authenticating, by the computer program, the user login credentials;

requesting, by the computer program, a browser session with the browser with a modified browser session idle time from a session provider, wherein the session provider is configured to generate a browser session cookie with the modified browser session idle time based on the electronic device information, wherein the modified browser session idle time differs from a default browser session idle time for the session provider;

receiving, by the computer program, the browser session cookie from the session provider; and communicating, by the computer program, the browser session cookie to the browser;

wherein the website or resource is configured to receive an interaction from the browser in the browser session, determine a current browser session idle time for the browser session, compare the current browser session idle time to the modified browser session idle time, and terminate the browser session in response to the current browser session idle time being greater than the modified browser session idle time.

2. The method of claim 1, wherein the modified browser session idle time has a shorter time than a default browser session idle time.

3. The method of claim 1, wherein the modified browser session idle time has a longer time than a default browser session idle time.

4. The method of claim 1, wherein the website or resource determines the current browser session idle time for the browser session based on a timestamp for the interaction with the browser and a last update timestamp in the browser session cookie.

5. A system, comprising:

an electronic device executing a browser;

a session provider; and an authentication platform for a website or resource executing a computer program;

wherein:

the computer program receives a user login comprising user login credentials and electronic device information for the electronic device from the browser, wherein the electronic device information identifies the electronic device as a public electronic device;

the computer program authenticates the user login credentials;

the computer program requests a browser session with the browser with a modified browser session idle time from the session provider;

the session provider generates a browser session cookie with the modified browser session idle time based on the electronic device information, wherein the modified browser session idle time differs from a default browser session idle time for the session provider;

the computer program receives the browser session cookie from the session provider;

the computer program communicates the browser session cookie to the browser;

the website or resource receives an interaction from the browser in the browser session;

the website or resource determines a current browser session idle time for the browser session;

the website or resource compares the current browser session idle time to the modified browser session idle time; and the website or resource terminates the browser session in response to the current browser session idle time being greater than the modified browser session idle time.

6. The system of claim 5, wherein the modified browser session idle time has a shorter time than a default session idle time.

7. The system of claim 5, wherein the modified browser session idle time has a longer time than a default browser session idle time.

8. The system of claim 5, wherein the website or resource determines the current browser session idle time for the browser session based on a timestamp for the interaction with the browser and a last update timestamp in the browser session cookie.

9. A non-transitory computer readable storage medium, including instructions stored thereon, which when read and executed by one or more computer processors, cause the one or more computer processors to perform steps comprising:

receiving, from a browser executed by an electronic device, a user login comprising user login credentials and electronic device information for the electronic device, wherein the electronic device information identifies the electronic device as a public electronic device;

authenticating the user login credentials;

requesting a browser session with the browser with a modified browser session idle time from a session provider, wherein the session provider is configured to generate a browser session cookie with the modified browser session idle time based on the electronic device information, wherein the modified browser session idle time differs from a default browser session idle time for the session provider;

receiving the browser session cookie from the session provider; and communicating the browser session cookie to the browser;

wherein a website or resource is configured to receive an interaction from the browser in the browser session, determine a current browser session idle time for the browser session, compare the current browser session idle time to the modified browser session idle time, and terminate the browser session in response to the current browser session idle time being greater than the modified browser session idle time.

10. The non-transitory computer readable storage medium of claim 9, wherein the modified browser session idle time has a shorter time than a default session idle time.

11. The non-transitory computer readable storage medium of claim 9, wherein the modified browser session idle time has a longer time than a default browser session idle time.

12. The non-transitory computer readable storage medium of claim 9, wherein the website or resource determines the current browser session idle time for the browser session based on a timestamp for the interaction with the browser and a last update timestamp in the browser session cookie.

* * * * *